(12) United States Patent
Schomer

(10) Patent No.: US 10,669,034 B2
(45) Date of Patent: Jun. 2, 2020

(54) TUBE TYPE PNEUMATIC DEICERS

(71) Applicant: Goodrich Corporation, Charlotte, NC (US)

(72) Inventor: Samual Steven Riczo Schomer, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 511 days.

(21) Appl. No.: 15/625,680

(22) Filed: Jun. 16, 2017

(65) Prior Publication Data

US 2018/0362167 A1    Dec. 20, 2018

(51) Int. Cl.
  *B64D 15/16*  (2006.01)

(52) U.S. Cl.
  CPC .................. *B64D 15/166* (2013.01)

(58) Field of Classification Search
  CPC .......................... B64D 15/166; B64D 15/16
  See application file for complete search history.

(56) References Cited

U.S. PATENT DOCUMENTS

| | | | |
|---|---|---|---|
| 2,536,739 A | | 1/1951 | Greene |
| 2,568,669 A | | 9/1951 | Totheroh |
| 2,957,662 A | * | 10/1960 | Hess |
| 3,623,684 A | | 11/1971 | Kline |
| 5,310,142 A | | 5/1994 | Weisend, Jr. |
| 6,443,394 B1 | | 9/2002 | Weisend, Jr. |

* cited by examiner

*Primary Examiner* — Justin M Benedik
(74) *Attorney, Agent, or Firm* — Kinney & Lange, P.A.

(57) ABSTRACT

A pneumatic deicer assembly includes a first stretch fabric with a first edge opposite a second edge. The first edge is positioned proximate the second edge such that the first stretch fabric forms a tube. A non-stretch fabric covers a seam formed between the first edge and the second edge of the first stretch fabric. A second stretch fabric covers the non-stretch fabric and a portion of the first stretch fabric.

15 Claims, 2 Drawing Sheets

TUBE TYPE PNEUMATIC DEICERS

BACKGROUND

The present disclosure relates to deicer equipment used in aircraft, and more specifically to pneumatic deicers.

Icing on aircraft is among one of the many in-flight challenges faced by aircraft. Under certain conditions, ice can accumulate rapidly on leading edge surfaces of the aircraft, reducing smooth air flow, increasing drag, and decreasing lift. Deicing equipment, such as pneumatic deicers, gives the pilot the ability to combat ice buildup.

Pneumatic deicers have historically included an internal bladder with a series of tubes laid next to one another and attached to at least one internal manifold. When attached to a leading edge surface, the tubes of a pneumatic deicer can be inflated to shatter and remove ice that accumulates on the leading surface. Typically, the tubes of the pneumatic deicers are formed from fabric layers that are sewn, bonded, or otherwise connected to each other. Over time, the internal pressure applied to the tubes during operation can cause separation of the fabric layers, especially at the seams and edges of the tubes.

SUMMARY

In one embodiment, a pneumatic deicer assembly includes a first stretch fabric with a first edge opposite a second edge. The first edge is positioned proximate the second edge such that the first stretch fabric forms a tube. A non-stretch fabric covers a seam formed between the first edge and the second edge of the first stretch fabric. A second stretch fabric covers the non-stretch fabric and a portion of the first stretch fabric.

In another embodiment, a pneumatic deicer tube for attachment to an aircraft component includes a bond side that is configured for connection to the aircraft component and a breeze side disposed opposite the bond side. A first tube edge connects the breeze side to the bond side. A second tube edge is disposed opposite the first tube edge and also connects the breeze side to the bond side. A first stretch fabric forms the bond side, the breeze side, the first tube edge, and the second tube edge of the tube. The first stretch fabric also includes a first edge opposite a second edge, with the first edge being positioned proximate the second edge on the bond side. A non-stretch fabric is disposed on the bond side of the tube and covers a seam formed between the first edge and the second edge of the first stretch fabric. A second stretch fabric covers the non-stretch fabric, the bond side, the first tube edge, and the second tube edge.

In another embodiment, a pneumatic deicer assembly includes a tube formed by a first stretch fabric. The tube includes a first end opposite a second end, and a top side opposite a bottom side. The bottom side and the top side both extend from the first end to the second end. A first tube edge extends from the first end to the second end and connects the top side to the bottom side. A second tube edge is disposed opposite the first tube edge. The second tube edge extends from the first end to the second end and connects the top side to the bottom side. A seam is formed on the bottom side of the tube and extends from the first end to the second end. A non-stretch fabric is connected to the bottom side and covers the seam. A second stretch fabric is connected to the tube and covers the non-stretch fabric, the bottom side of the tube, the first tube edge, and the second tube edge.

Persons of ordinary skill in the art will recognize that other aspects and embodiments are possible in view of the entirety of the present disclosure, including the accompanying figures.

Figure 1:
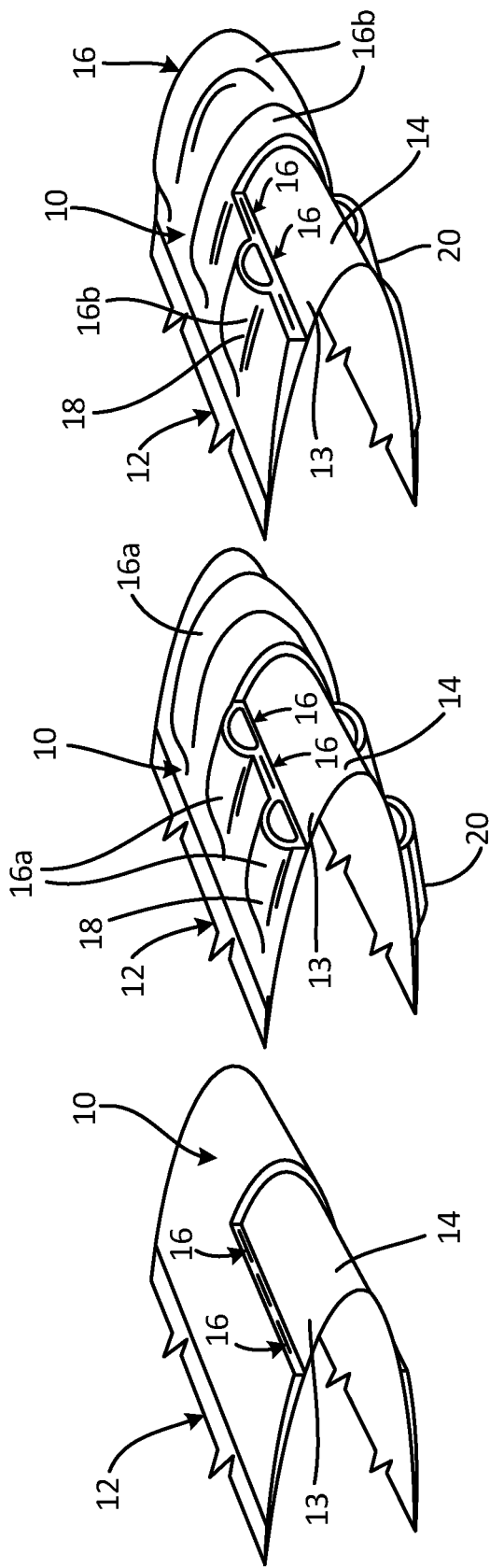
FIG. 1a is a perspective partial cross-sectional view of a pneumatic deicer assembly connected to a flow surface leading edge.
FIG. 1b is another perspective partial cross-sectional view of the pneumatic deicer assembly from FIG. 1a with a first set of tubes inflated.
FIG. 1c is another perspective partial cross-sectional view of the pneumatic deicer assembly from FIG. 1a with a second set of tubes inflated.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings. Like reference numerals identify similar structural elements.

DETAILED DESCRIPTION

The disclosure relates to a pneumatic deicer assembly for an aircraft. The pneumatic deicer assembly includes inflatable tubes, each tube having three pieces of fabric: a first stretch fabric, a non-stretch fabric, and a second stretch fabric. The first stretch fabric forms a bond side, a breeze side, a first tube edge, and a second tube edge of the tube. The first tube edge and the second tube edge connect the breeze side to the bond side of the tube. The non-stretch fabric is disposed on the bond side of the tube and covers a seam formed by the first stretch fabric. The second stretch fabric covers the non-stretch fabric, the bond side, the first tube edge, and the second tube edge. The second stretch fabric reinforces the first tube edge, the second tube edge, and the connection between the non-stretch fabric and the first stretch fabric, thereby increasing the service live of the pneumatic deicer assembly. The tubes of the pneumatic deicer assembly are described below with reference to FIGS. 1a-3.

FIGS. 1a-1c will be discussed concurrently. FIGS. 1a-1c are perspective partial cross-sectional views of pneumatic deicer assembly 10 connected to flow surface 13 and leading edge 14 of aircraft component 12. As shown in FIGS. 1a-1c, pneumatic deicer assembly 10 includes first set 16a of tubes 16, and second set 16b of tubes 16. Each of tubes 16 includes first end 18 and second end 20, with first end 18 disposed opposite second 20.

Aircraft component 12 in FIGS. 1a-1c is a wing. In other embodiments, aircraft component 12 can be an engine inlet, a flight control structure, an airfoil, an empennage, a fuselage, and/or any other desired aircraft part. Tubes 16 are arranged in parallel next one another and each of tubes 16 can be arrange to extend transversely over leading edge 14 of aircraft component 12 between first end 18 and second end 20. In other embodiments, tubes 16 can be arranged generally parallel with leading edge 14. As shown in FIG. 1a, all of tubes 16 are deflated when leading edge 14 of aircraft component 12 is clear and free of ice. Should ice accumulate on leading edge 14 and pneumatic deicer assembly 10 during operation of aircraft component 12, a first manifold (not shown) inflates tubes 16 in first set 16a with air to break and remove the ice, as shown in FIG. 1b. After tubes 16 in first set 16a have been inflated, tubes 16 in second set 16b are inflated with air by a second manifold (not shown) while first set 16a of tubes 16 is deflated, as shown in FIG. 1c. Alternating the inflation and deflation of first set 16a and second set 16b of tubes 16 may allow pneumatic deicer assembly 10 to operate with less disruption to airflow over the protected surface. Tubes 16a and 16b may inflate simultaneously in some iterations of this invention. The construction of tubes 16 is discussed below with reference to FIGS. 2 and 3.

Figure 2:
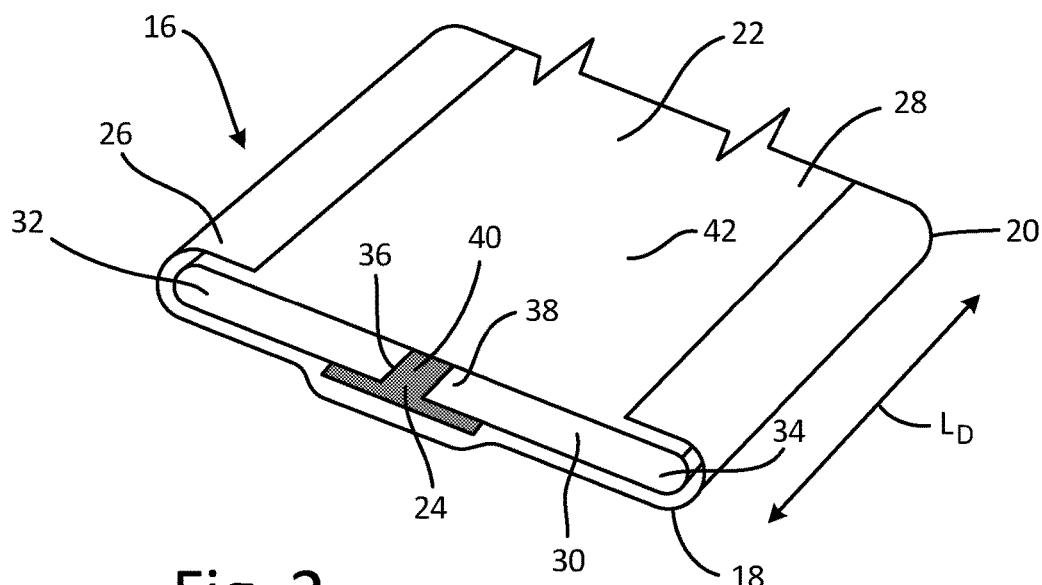
FIG. 2 is a perspective cross-sectional view of a tube from the pneumatic deicer assembly of FIGS. 1a-1c.
Figure 3:
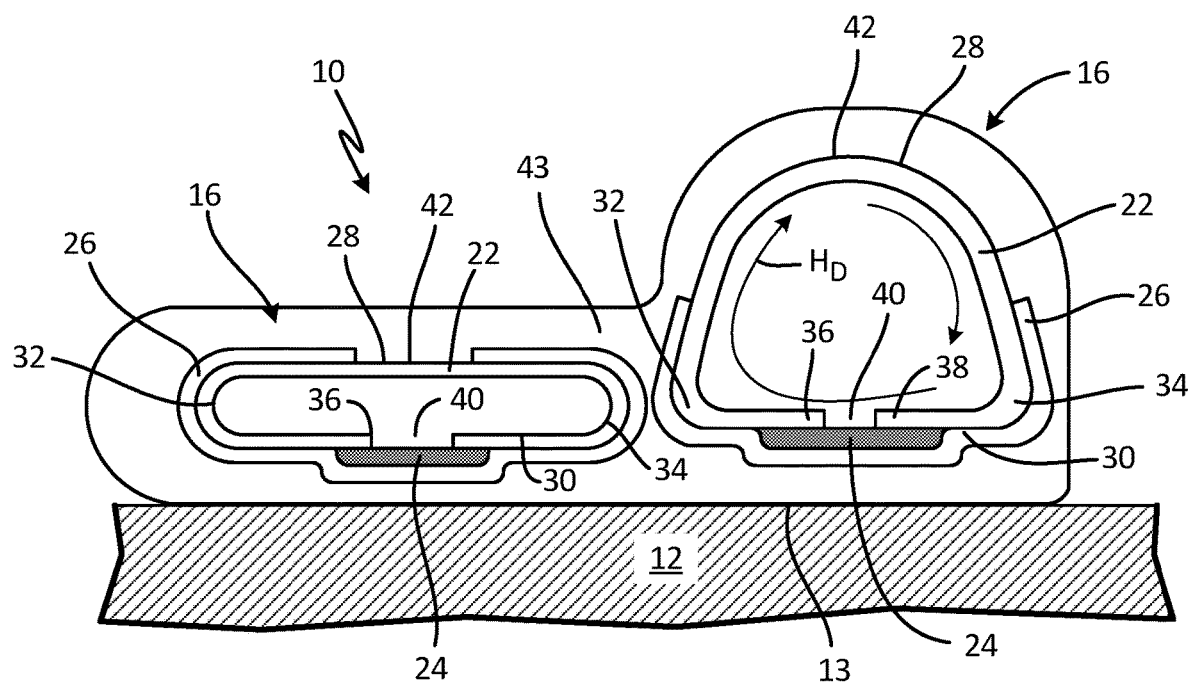
FIG. 3 is a cross-sectional view of the pneumatic deicer assembly of FIGS. 1a-1c.

FIGS. 2 and 3 will be discussed concurrently. FIG. 2 is a perspective cross-sectional view of one of tubes 16 from FIGS. 1a-1c, FIG. 3 is a cross-sectional view of two tubes 16 (one inflated and the other deflated) from pneumatic deicer assembly 10. As shown in FIGS. 2 and 3, each of tubes 16 further includes first stretch fabric 22, non-stretch fabric 24, second stretch fabric 26, breeze side 28, bond side 30, first tube edge 32, and second tube edge 34. First stretch fabric 22 includes first edge 36, second edge 38, seam 40, and uncovered portion 42. As shown in FIG. 3, pneumatic deicer assembly 10 also includes elastomer-fabric matrix 43 in addition to tubes 16.

Tube 16 is formed by first stretch fabric 22. First edge 36 of first stretch fabric 22 is disposed opposite second edge 38 of first stretch fabric 22. To form tube 16 from first stretch fabric 22, first stretch fabric is folded such that first edge 36 is positioned proximate second edge 38 to form seam 40. With first edge 36 and second edge 38 of first stretch fabric 22 folded together, first stretch fabric 22 forms bond side 30, breeze side 28, first tube edge 32, and second tube edge 34 of tube 16. Breeze side 28 is disposed opposite bond side 30, and bond side 30 and breeze side 28 both extend from first end 18 to second end 20 of tube 16. In a deflated state, breeze side 28 and bond side 28 are generally flat and parallel to one another, and vacuum is often applied to hold tubes 16 shut. Seam 40 is disposed on bond side 30 and extends from first end 18 to second end 20 of tube 16. First tube edge 32 extends from first end 18 to second end 20 of tube 16 and connects breeze side 28 to bond side 30. Second tube edge 34 is disposed opposite first tube edge 32 and also extends from first end 18 to second end 20. Second tube edge 34 also connects breeze side 28 to bond side 30.

First stretch fabric 22 is a knit fabric, such as nylon, that is configured to stretch in hoop direction $H_D$ of tube 16 without stretching in length direction $L_D$ of tube 16. Hoop direction $H_D$ of tube 16 is defined as the direction that follows the circumference of tube 16. Length direction $L_D$ of tube 16 is defined as the direction that follows the length of tube 16 between first end 18 and second end 20 of tube 16. Prior to assembling of pneumatic deicer assembly 10, first stretch fabric 22 is completely coated on both sides by an elastomeric coating (not shown) so as to impede air from leaking through first stretch fabric 22. For example, first stretch fabric 22 can be coated on all sides via an elastomeric coating such as natural rubber.

Non-stretch fabric 24 is connected to first stretch fabric 22 on bond side 30 of tube 16. Non-stretch fabric 24 extends from first end 18 of tube 16 to second end 20 of tube 16 and covers seam 40. Non-stretch fabric 24 can connect first edge 36 of first stretch fabric 22 to second edge 38 of first stretch fabric 22 to close seam 40. First edge 36 of first stretch fabric 22 can also be stitched to second edge 38 of first stretch fabric 22 before non-stretch fabric 24 is connected to bond side 30. Non-stretch fabric 24 can be formed from a woven fabric that is not configured to stretch, such as a nylon fabric with a square weave. Because non-stretch fabric 24 is not configured to stretch, non-stretch fabric 24 reduces expansion on bond side 30 during use, helping to form a base for tube 16 that is connected to aircraft component 12. Prior to assembling of pneumatic deicer assembly 10, non-stretch fabric 24 is completely coated on both sides by an elastomeric coating (not shown) so as to impede air from leaking through non-stretch fabric 24. The elastomeric coating on non-stretch fabric 24 can have the same composition as the elastomeric coating on first stretch fabric 22. For example, non-stretch fabric 24 can be coated on all sides via an elastomer coating, such as natural rubber.

Second stretch fabric 26 is connected to non-stretch fabric 24 and first stretch fabric 22 such that second stretch fabric 26 completely covers both non-stretch fabric 24 and bond side 30 of tube 16. As shown in FIGS. 2 and 3, second stretch fabric 26 also extends around both first tube edge 32 and second tube edge 34 and onto breeze side 28 such that second stretch fabric 26 covers first tube edge 32 and second tube edge 34.

While second stretch fabric 26 extends onto breeze side 28 of tube 16 to cover first tube edge 32 and second tube edge 34, second stretch fabric 26 does not completely cover breeze side 28 of tube 16. Breeze side 28 of tube 16 includes uncovered portion 42, which is the portion of breeze side 28 of tube 16 that is not covered by second stretch fabric 26. Uncovered portion 42 of breeze side 28 includes a majority of breeze side 28 and extends from first end 18 of tube 16 to second end 20 of tube 16. Uncovered portion 42 of breeze side 28 allows first stretch fabric 22 on breeze side 28 to more readily stretch and expand when tube 16 is inflated. During operation of tube 16, ice is expected to accumulate on breeze side 28 of tube 16. Expansion of breeze side 28 gives tube 16 the ability to break and shed the ice. As is understood by those with skill in the art, the height of the tube inflation is a critical performance feature of pneumatic de-icers.

Prior to assembling of second stretch fabric 26 onto tube 16, second stretch fabric 26 is completely coated on both sides by an elastomeric coating (not shown) so as to impede air from leaking through second stretch fabric 26. The elastomeric coating on second stretch fabric 26 can have the same composition as the elastomeric coatings on first stretch fabric 22 and non-stretch fabric 24. For example, second stretch fabric 26 can be coated on all sides via an elastomer, such as natural rubber. After second stretch fabric 26 is assembled onto tube 16, first stretch fabric 22, non-stretch fabric 24, and second stretch fabric 26 can undergo a process that chemically bonds and cures the elastomer coatings of first stretch fabric 22, non-stretch fabric 24, and second stretch fabric 26 together into a unitary piece. As shown in FIG. 3, tube 16 can be further embedded in elastomer-fabric matrix 43 to connect tube 16 with the other tubes 16 of pneumatic deicer assembly 10. Tube 16 is connected into pneumatic deicer assembly 10 such that bond side 30 of tube 16 will face aircraft component 12 and be connected to aircraft component 12. Breeze side 28 faces away from aircraft component 12.

In view of the foregoing description, it will be recognized that the present disclosure provides numerous advantages and benefits. During use of pneumatic deicer assembly 10, first tube edge 32, second tube edge 34, and seam 40 are the portions of tube 16 where stress is high, and where delamination and leakage is most likely to occur in tube 16. Second stretch fabric 26 helps reduce leakage at seam 40, first tube edge 32, and second tube edge 34 by reinforcing the bond between non-stretch fabric 24 and bond side 30, and by adding an additional layer of support on bond side 30, first edge 32, and second edge 34. By reinforcing tube 16 against delamination and leakage, second stretch fabric 26 extends the service life of pneumatic deicer assembly 10.

The following are non-exclusive descriptions of possible embodiments of the present invention.

In one embodiment, a pneumatic deicer assembly includes a first stretch fabric with a first edge opposite a second edge. The first edge is positioned proximate the second edge such that the first stretch fabric forms a tube. A non-stretch fabric covers a seam formed between the first edge and the second edge of the first stretch fabric. A second stretch fabric covers the non-stretch fabric and a portion of the first stretch fabric.

The pneumatic deicer assembly of the preceding paragraph can optionally include, additionally and/or alternatively, any one or more of the following features, configurations and/or additional components:

the tube comprises: a breeze side; a bond side disposed opposite the breeze side, wherein the seam formed between the first edge and the second edge of the first stretch fabric is disposed on the bond side; a first tube edge connecting the breeze side to the bond side; and a second tube edge disposed opposite the first tube edge, wherein the second tube edge also connects the breeze side to the bond side;

the second stretch fabric covers the bond side, the first tube edge, and the second tube edge;

a portion of the breeze side is not covered by the second stretch fabric;

the first stretch fabric is coated on both sides by an elastomeric coating;

the non-stretch fabric is coated on both sides by an elastomeric coating; and/or the second stretch fabric is coated on both sides by an elastomeric coating.

In another embodiment, a pneumatic deicer tube for attachment to an aircraft component includes a bond side that is configured for connection to the aircraft component and a breeze side disposed opposite the bond side. A first tube edge connects the breeze side to the bond side. A second tube edge is disposed opposite the first tube edge and also connects the breeze side to the bond side. A first stretch fabric forms the bond side, the breeze side, the first tube edge, and the second tube edge of the tube. The first stretch fabric also includes a first edge opposite a second edge, with the first edge being positioned proximate the second edge on the bond side. A non-stretch fabric is disposed on the bond side of the tube and covers a seam formed between the first edge and the second edge of the first stretch fabric. A second stretch fabric covers the non-stretch fabric, the bond side, the first tube edge, and the second tube edge.

The pneumatic deicer tube of the preceding paragraph can optionally include, additionally and/or alternatively, any one or more of the following features, configurations and/or additional components:

a portion of the breeze side is not covered by the second stretch fabric;

the first stretch fabric is coated on both sides by an elastomeric coating;

the non-stretch fabric is coated on both sides by an elastomeric coating;

the second stretch fabric is coated on both sides by an elastomeric coating; and/or the first stretch fabric is configured to stretch in a hoop direction of the tube without stretching in a length direction of the tube.

In another embodiment, a pneumatic deicer assembly includes a tube formed by a first stretch fabric. The tube includes a first end opposite a second end, and a top side opposite a bottom side. The bottom side and the top side both extend from the first end to the second end. A first tube edge extends from the first end to the second end and connects the top side to the bottom side. A second tube edge is disposed opposite the first tube edge. The second tube edge extends from the first end to the second end and connects the top side to the bottom side. A seam is formed on the bottom side of the tube and extends from the first end to the second end. A non-stretch fabric is connected to the bottom side and covers the seam. A second stretch fabric is connected to the tube and covers the non-stretch fabric, the bottom side of the tube, the first tube edge, and the second tube edge.

The pneumatic deicer assembly of the preceding paragraph can optionally include, additionally and/or alternatively, any one or more of the following features, configurations and/or additional components:

a portion of the top side of the tube is not covered by the second stretch fabric;

the portion of the top side of the tube that is not covered by the second stretch fabric extends from the first end of the tube to the second end of the tube;

the non-stretch fabric and the second stretch fabric both extend from the first end of the tube to the second end of the tube;

a majority of the top side of the tube is not covered by the second stretch fabric;

the first stretch fabric, the non-stretch fabric, and the second stretch fabric are each coated on both sides by an elastomeric coating; and/or the first stretch fabric is configured to stretch in a hoop direction of the tube without stretching in a length direction of the tube.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIGS. 1a-3 show tubes 16 inflating in an alternate manner, it is possible for all of tubes 16 to inflate simultaneously should the situation require. Furthermore, in other embodiments, tubes 16 can be oriented in a spanwise direction perpendicular to the orientation of tubes 16 shown in FIGS. 1a-1c. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pneumatic deicer assembly comprising:
   a first stretch fabric with a first edge opposite a second edge, wherein the first edge is positioned proximate the second edge such that the first stretch fabric forms a tube, wherein the tube comprises:
   a breeze side;
   a bond side disposed opposite the breeze side, wherein a seam formed between the first edge and the second edge of the first stretch fabric is disposed on the bond side;
   a first tube edge connecting the breeze side to the bond side; and
   a second tube edge disposed opposite the first tube edge, wherein the second tube edge also connects the breeze side to the bond side;
   a non-stretch fabric covering the seam formed between the first edge and the second edge of the first stretch fabric; and
   a second stretch fabric covering the non-stretch fabric and a portion of the first stretch fabric, wherein the second stretch fabric covers the bond side, the first tube edge, and the second tube edge, and a portion of the breeze side is not covered by the second stretch fabric.

2. The pneumatic deicer assembly of claim 1, wherein the first stretch fabric is coated on both sides by an elastomeric coating.

3. The pneumatic deicer assembly of claim 2, wherein the non-stretch fabric is coated on both sides by an elastomeric coating.

4. The pneumatic deicer assembly of claim 3, wherein the second stretch fabric is coated on both sides by an elastomeric coating.

5. A pneumatic deicer tube for attachment to an aircraft component, wherein the tube comprises:
   a bond side that is configured for connection to the aircraft component,
   a breeze side disposed opposite the bond side;
   a first tube edge connecting the breeze side to the bond side;
   a second tube edge disposed opposite the first tube edge, wherein the second tube edge also connects the breeze side to the bond side;
   a first stretch fabric with a first edge opposite a second edge, wherein the first stretch fabric forms the bond side, the breeze side, the first tube edge, and the second tube edge of the tube, and the first edge is positioned proximate the second edge on the bond side;
   a non-stretch fabric on the bond side of the tube and covering a seam formed between the first edge and the second edge of the first stretch fabric; and
   a second stretch fabric covering the non-stretch fabric, the bond side, the first tube edge, and the second tube edge, wherein a portion of the breeze side is not covered by the second stretch fabric.

6. The pneumatic deicer tube of claim 5, wherein the first stretch fabric is coated on both sides by an elastomeric coating.

7. The pneumatic deicer tube of claim 6, wherein the non-stretch fabric is coated on both sides by an elastomeric coating.

8. The pneumatic deicer tube of claim 7, wherein the second stretch fabric is coated on both sides by an elastomeric coating.

9. The pneumatic deicer tube of claim 5, wherein the first stretch fabric is configured to stretch in a hoop direction of the tube without stretching in a length direction of the tube.

10. A pneumatic deicer assembly comprising:
    a tube formed by a first stretch fabric, the tube comprising:
    a first end opposite a second end;
    a top side opposite a bottom side, wherein the bottom side and the top side extend from the first end to the second end;
    a first tube edge extending from the first end to the second end and connecting the top side to the bottom side; and
    a second tube edge opposite the first tube edge, wherein the second tube edge extends from the first end to the second end and connects the top side to the bottom side; and
    a seam formed on the bottom side and extending from the first end to the second end;
    a non-stretch fabric connected to the bottom side and covering the seam; and
    a second stretch fabric connected to the tube and covering the non-stretch fabric, the bottom side of the tube, the first tube edge, and the second tube edge, wherein a portion of the top side of the tube is not covered by the second stretch fabric.

11. The pneumatic deicer assembly of claim 10, wherein the portion of the top side of the tube that is not covered by the second stretch fabric extends from the first end of the tube to the second end of the tube.

12. The pneumatic deicer assembly of claim 11, wherein the non-stretch fabric and the second stretch fabric both extend from the first end of the tube to the second end of the tube.

13. The pneumatic deicer assembly of claim 12, wherein a majority of the top side of the tube is not covered by the second stretch fabric.

14. The pneumatic deicer assembly of claim 13, wherein the first stretch fabric, the non-stretch fabric, and the second stretch fabric are each coated on both sides by an elastomeric coating.

15. The pneumatic deicer assembly of claim 14, wherein the first stretch fabric is configured to stretch in a hoop direction of the tube without stretching in a length direction of the tube.

* * * * *